United States Patent [19]

Todd, Jr. et al.

[11] Patent Number: 5,041,300

[45] Date of Patent: Aug. 20, 1991

[54] HOP FLAVOR WHICH IS ODOR FORMING IMPURITY FREE

[75] Inventors: Paul H. Todd, Jr.; James A. Guzinski, both of Kalamazoo, Mich.

[73] Assignee: Kalamazoo Holdings, Inc., Kalamazoo, Mich.

[21] Appl. No.: 516,769

[22] Filed: Apr. 30, 1990

Related U.S. Application Data

[60] Continuation of Ser. No. 196,145, May 19, 1988, Pat. No. 4,956,195, which is a division of Ser. No. 34,917, Apr. 3, 1987, Pat. No. 4,778,691.

[51] Int. Cl.$^5$ .............................................. A23L 1/28
[52] U.S. Cl. ....................................... 426/600; 568/377
[58] Field of Search ......................... 426/600; 568/377

[56] References Cited

U.S. PATENT DOCUMENTS

| | | | |
|---|---|---|---|
| 3,875,316 | 4/1975 | Humphrey | 426/600 |
| 3,956,513 | 5/1976 | Clarke | 426/600 |
| 3,965,188 | 6/1976 | Westermann | 426/600 |
| 3,977,953 | 8/1976 | Von Hirsch | 426/600 |
| 4,590,296 | 5/1986 | Cowles | 426/600 |
| 4,666,731 | 5/1987 | Todd | 426/600 |
| 4,758,445 | 7/1988 | Klusters | 426/600 |
| 4,767,640 | 8/1988 | Goldstein | 426/600 |
| 4,778,691 | 10/1988 | Todd | 426/600 |
| 4,918,240 | 4/1990 | Todd | 568/377 |
| 4,956,195 | 9/1990 | Todd | 426/600 |

*Primary Examiner*—Carolyn Paden
*Attorney, Agent, or Firm*—Gordon W. Hueschen

[57] ABSTRACT

Two-phase and salt-containing intermediate products and the final purified hop flavor which is essentially free of impurities and which purified isoalpha acid or isohumulone will therefore not produce fruity, estery, sour aromas when used to flavor beverages, e.g., beer or ale, are disclosed. A rapid test for the detection of such aromas, involving dissolution of the hop flavor in ethanol at a concentration of one-half percent w/v and allowing the solution to stand for four days, allows accelerated determination of the presence or absence of such aromas and the odor-forming impurities which cause the undesirable odors.

25 Claims, No Drawings

HOP FLAVOR WHICH IS ODOR FORMING IMPURITY FREE

This is a continuation of application Ser. No. 196,145, filed May 19, 1988, now U.S. Pat. No. 4,956,195, issued Sept. 11, 1990, which in turn is a division of application Ser. No. 34,917, filed Apr. 3, 1987, now U.S. Pat. No. 4,778,691, issued Oct. 18, 1988.

BACKGROUND OF THE INVENTION

1. Field of Invention

Hop flavors, compositions thereof, unreduced alpha and isoalpha acids, reduced alpha and isoalpha acids, removal of undesirable odor-forming impurities therefrom, hop flavors which do not contain such impurities, flavoring of beer including ale therewith.

2. Prior Art and the Invention Broadly Stated

Hop flavors of the isoalpha acid types enumerated under FIELD OF INVENTION have attracted widespread interest in recent years for use in the controlled and standardized flavoring of beer including ale, especially by post-fermentation treatment. The present invention involves the discovery that certain hitherto-unrecognized undesirable odor-forming impurities (the exact structure and nature of which is yet unknown) exist in all of these hop flavors which, if allowed to remain, in time give rise to undesirable aromas of a fruity, estery, fatty or sour nature upon standing or storage of beers flavored post-fermentation therewith. The present invention accordingly also involves the removal of such undesirable odor-forming impurities from the starting hop flavor with production of a purified hop flavor which is essentially free of undesirable amounts of such odor-forming impurities and hence also free of such odor- or aroma-contaminating tendency when employed to flavor beer post-fermentation. The method for eliminating the said impurities involves their extraction from the hop flavor into water at a pH above about 4, preferably above about 6 or 7, the exact preference in pH depending upon the acidity of the hop flavor being extracted, sometimes in the presence of solvent such as residual carbon dioxide, hexane, or lower-alkanol such as ethanol, and preferably in the presence of a salt for purposes of keeping most if not all of the hop flavor itself in the organic phase, an important economic consideration. Although the PRIOR ART has employed highly-acidic (pH 2 and below) aqueous extractions of such starting hop flavors to remove previously-recognized impurities such as metals, tannins, and sugars, extractions at such low pH levels will not and does not remove the odor-forming impurities discovered and eliminated according to the present invention. Neither does the procedure of the prior art, which has been used to extract crude isomerized whole hop extracts with water to produce an aqueous phase, still containing the impurities together with small amounts of isoacids which will dissolve in the water at the pH level employed, eliminate these impurities or provide a suitable post-fermentation flavor, even though such solutions have been suggested for flavoring of beer post-fermentation and are reported to be non-haze-forming. (Westermann U.S. Pat. No. 3,798,332).

OBJECTS OF THE INVENTION

An object of the invention is to provide a method for the removal of hitherto-unrecognised odor- or aroma-forming impurities from hop flavors of the type described and the novel purified hop flavors thus produced. Another object is the provision of beer including ale which is flavored with such a novel, and odor-causing impurity-free, isoacid type of hop flavor and which accordingly has more reproducible and acceptable flavor and aroma. A further object is the provision of such a method which involves extraction of the impurities from the hop flavor into water, preferably by agitation therewith, at a pH above about 4 and preferably above about 6 or 7, the exact preference depending upon the pH of the type of starting hop flavor being extracted, preferably in the presence of sufficient water-soluble salt to maintain as much as possible of the starting hop flavor in the organic phase, as well as the important two-phase and salt-containing intermediate products thus produced. Still another object is the provision of such process when conducted in the presence of organic solvent of the type which is commonly employed for extraction of hops, or as solvent for reduction of alpha acids (humulone), such as hexane or lower-alkanol such as ethanol. Additional objects will become apparent hereinafter, and still other objects will be obvious to one skilled in the art.

SUMMARY OF THE INVENTION

In summary, then, what we believe to be our invention, inter alia, comprises the extraction of hitherto-unrecognized odor-forming impurities from hop flavors, of the type previously identified, with water at a pH of at least 4, preferably at least 6 or 7, and preferably in the presence of a salt, optionally in the presence of a solvent, especially of the type used for extraction of hops or reduction of alpha acids, and removal of the aqueous phase containing the impurities from the organic phase comprising the hop flavor, thereby providing a essentially impurity-free isoalpha hop flavor for use in the post-fermentation flavoring of beer including ale. The novel purified non-objectionable-aroma-forming hop flavors, and the important two-phase and salt-containing intermediate products, also constitute a part of the present invention. By optional fractionation and/or dilution of the impurities, favorable aroma segments can be separated and employed to impart a nose (an aroma) to beverages, especially non-alcoholic beverages. For additional summarization of the invention, the reader is referred to the BACKGROUND OF THE INVENTION, OBJECTS, THE INVENTION IN FURTHER DETAIL, THE ABSTRACT, and the CLAIMS of this Application.

FURTHER DETAILED BACKGROUND OF INVENTION

One of the continuous objects of present brewing technology is to make reproducible brews. Difficulties are encountered at every step in this "natural" process: unwanted variations in yeast cultures, in hops, in malt, in adjuncts, and even in times, temperatures, and the human element of the brewhouse. Beer is not simply an alcoholic drink; it is a very subtle combination of carbonation, foam, mouth feel, palate bitterness, nose, and aroma when smelled and swallowed. Whatever can be done to improve the reproducibility and control of even one variable—yeast, hops, malt, adjuncts—is exceptionally important. This invention describes an important improvement in the control of hop-derived flavor.

Hops have been used for centuries to flavor beer and are considered, along with water, yeast, and malt, to be an essential ingredient thereof. Since the sixties, following elucidation of the structure of the hop bittering compounds in the fifties by such pioneering investigators as Rigby and Verzele, various forms of hop extracts and their hydrogenated and/or otherwise reduced derivatives have found their way into commercial application. These forms have depended upon certain specific attributes for achieving commercial success.

Among the first of such forms was a light-stable reduced (dihydro) isoalpha acid made with sodium borohydride. Improvements in this form were described by Westermann (U.S. Pat. Nos. 3,558,326 and 3,798,332). Alternative light-stable forms, tetrahydro- and hexahydroisoalpha acids, find increasing acceptance because of their foam-stabilizing properties, and were described by Worden (U.S. Pat. Nos. 3,552,975 and 3,923,897).

Concurrent with these developments addressing light stability, procedures for making light-unstable forms of isoalpha acids, normally found in beer, were the subject of numerous patents. Among these are Humphrey (U.S. Pat. No. 3,875,316), Mitchell (U.S. Pat. Nos. 3,073,052 and 3,949,092), Laws (U.S. Pat No. 4,298,626) and Todd (U.S. Pat. No. 4,002,683). These patents addressed problems of making isoalpha acids acceptable to the state of the existing art. Other patents discussed preventing the action of "gushing" promoters (addressed in the form of prevention by the use of additives in Carrington (BP 1,376,306) or effecting solubilization (Mitchell U.S. Pat. No. 3,949,092 and Todd U.S. Pat. No. 3,486,906). A recent process improvement is described by Humphrey (U.S. Pat. No. 4,302,479), which uses a highly acidic (below pH 1) purification step. Such pre-isomerized extracts have found wide acceptance in the art of brewing, particularly in England, because of their economic advantages over raw hops, and because they can be stored indefinitely.

More recently, interest has been expressed in the use of hop extracts prepared with carbon dioxide (e.g., E. Kruger, "The Use of $CO_2$ in the Manufacture of Hop Products," *Monatsschrift fur Brauerei*, 33, Nr. 3 - 1980 Marz). Baker's (U.S. Pat. No. 4,247,483) work envisages the preparation of isoalpha acids without the use of organic solvents, in the event the organic solvent of choice, such as hexane, cannot be totally removed in a given processing technique. The carbon dioxide extracts also contain fewer of the more polar hop extract compounds, and therefore are richer in the desirable alpha acids than their organic solvent counterparts. This gives them economic advantages in the subsequent refining of the valuable hop constituents, such as alpha and beta acids and hop essential oils.

Indeed, a direct solvent-free procedure for isolating the alpha acids and isomerizing them, starting with a carbon dioxide extract, is described in a copending application (Todd, U.S. Ser. No. 584,525, now U.S. Pat. No. 4,666,731). This procedure substantially avoids the formation of undesirable humulinic acid and gushing promoters, so that subsequent solvent-based purification is not required.

A procedure for the making of unpurified tetrahydro isoalpha acids without the use of any organic solvent other than ethanol, starting with a carbon dioxide extract, has recently been patented by Cowles (U.S. Pat. Nos. 4,590,296 and 4,644,084).

While the above work on making and improving the hop-bittering flavor, derived from isoalpha acids, was taking place, other work on the contribution of hops to the aroma and non-bitter flavor of beer was underway. Seminal papers by Tressl, Peacock, and Seaton (Tressl, Roland, et al., "Studies of the Volatile Composition of Hops During Storage," J. Agric. Food Chem., Vol. 26, No. 6, 1978; Peacock, Val, et al., "Floral Hop Aroma in Beer," J. of Agricultural & Food Chemistry, 1981, 29, 1265; Seaton, J. C., et al., "The Refinement of Hop Flavor by Yeast Action," Proc. of the Austrian Brewing Convention, 1982, pp 117–124) have described the discovery of new, important hop essential oil-derived compounds, such as humulene epoxide and terpene alcohols, and suggested their role in imparting a "hoppy" flavor to beer. One way of adding this hop essential oil post-fermentation dissolved in liquid carbon dioxide has been developed by the Brewing Industry Research Foundation in England. Another technique is described in our recent patent (U.S. Pat. No. 4,647,464 of Todd and Guzinski).

The art therefore provides procedure for adding both bittering flavors (light stable or unstable isoalpha acids) and hop aromas (essential oils) to the beer, post-fermentation, as a method of controlling beer flavor.

Although the use of these techniques has gained wide acceptance in England, where strong-flavored Ales and Stouts are common, they are much less preferred in the United States, where milder beers are the custom. The present invention identifies for the first time one possible reason for this difference in preference, which may be related to fruity-estery-fatty or sour aromas produced by previously-unrecognized and newly-discovered hop-derived substances which are present in the isoalpha acid preparations (the form in which the hop flavor is introduced into the beer post-fermentation), and which become deleterious when added to beer at such time (post-fermentation).

We have found that these hitherto-unrecognized and still unidentified hop-derived substances, when present during fermentation, are either metabolized or removed by the yeast. However, when they are added post-fermentation, they complex or esterify with the alcohol present to give the undesirable fruity-estery-fatty or sour type of aromas during normal storage of the beer. Therefore, such a flavored fresh beer may be acceptable, but one aged for several weeks may not.

The present invention describes a method of removing these objectionable impurities from a hop flavor of the type previously described, so that the isoalpha acids derived therefrom will not cause the fruity aroma to develop upon aging of the beer (when added post-fermentation). The procedure of the invention can be used with or without solvents, and in the preparation of all forms of light-unstable and light-stable isoalpha acids.

Accordingly, the present invention has as one of its primary objects the provision of isoalpha acids which will not cause a beer to develop fruity-estery-fatty or sour aromas upon aging. These purified isoalpha acids will now enable a brewer to take full advantage of the economics and control of adding both isoalpha acids and hop oils post-fermentation, without fear of the development of unwanted flavors and aromas during normal aging of the beer on the shelf.

THE INVENTION IN FURTHER DETAIL

Such trace amounts of undesirable hop-derived impurities, which form fatty-fruity-estery aromas when added post-fermentation to beer, can be removed from alpha acids and isoalpha acids by water extraction thereof with or without a salt component (without salt is less preferable) at a pH above about 4.0 without the loss of unacceptable amounts of the alpha or isoalpha acids. The thus purified alpha acids, when converted to isoalpha acids, or the thus-purified isoalpha acids, can be added post-fermentation to beer without the formation of the aforementioned undesirable aromas, which are generated when the now removed impurities are added post-fermentation.

This method of the invention can be applied to alpha acids (preferable) and isoalpha acids (less preferable). It can be carried out without the presence of solvents (preferable) or with solvents (less preferable unless solvents are used to extract the hops).

The prior art does not acknowledge or recognize these deleterious impurities or make any conscious or unconscious effort to remove them. For example, Todd (.U.S Pat. No. 4,002,683) removes humulinic acid, tannins, sugars, and gushing promoters. Humphrey (U.S. Pat. No. 4,302,479) performs a highly-acidic wash of an organic solvent solution of extract. Neither procedure, because of the very acidic pH used for purification, will remove the rather pH neutral materials separated and removed according to this invention. Lance (U.S. Pat. No. 4,395,431) elutes these substances with the alpha acids, and does not remove or separate them. Westermann (U.S. Pat. No. 3,798,332), oblivious to their existence, concentrates them with his so-called pure isoalpha acids. The novel procedure of Humphrey (U.S. Pat. No. 3,875,316) likewise does not remove them.

The preferred embodiment of this invention is to mix the hop flavor, whether reduced or unreduced alpha or isoalpha acid, with an essentially aqueous salt solution with agitation at a pH. between about 7 and 10 in the presence of a water-soluble salt, and separating the aqueous phase containing the deleterious odor-forming substances from the organic remainder of the extract. The organic phase remainder of the hop flavor, whether alpha acids or isoalpha acids, may then be prepared as isoalpha acid to serve as a post-fermentation hop-flavor bittering agent, and will not cause fruity-estery-fatty aromas to develop in the beer upon aging.

The preferred method of the invention is to start with an already "pre-purified" hop flavor and, in the following examples, which show purification of both unreduced and reduced alpha and isoalpha acids, the hop acids were of greater than 90% purity. Thus, the preferred method, when an isoalpha acid is used as starting hop flavor, is to use an isoalpha acid at least as pure as that obtained by Westermann (U.S. Pat. No. 3,798,332) or Humphrey (U.S. Pat. No. 3,875,316).

An especially preferred embodiment of the invention is to first remove the alpha acids from the hop extract, and then subject the separated alpha acid to the purification procedure of the invention. This may be done with or without an organic solvent being present, depending upon whether or not carbon dioxide or an organic solvent was used to extract the hops. When tetrahydroalpha acid is being purified, since it is less acidic than unreduced alpha acids, a higher pH may be used in the purification without the loss of significant amounts of alpha acid.

A less preferred embodiment is to purify the separated isoalpha acid with the aqueous salt solution. This is preferably done at a lower pH than with the alpha acid, since the isoalpha acid is more acidic. Alternatively, higher salt concentrations are required to prevent or minimize the loss of significant portions of isoalpha acids, or several salt water washes of the isoalpha acids may be required to achieve the desired level of purity.

The salt used in this invention may be any acceptable water-soluble food-grade salt, such as sodium chloride, potassium chloride, or their bicarbonates or sulfates. Because of its economy, sodium chloride is the preferred salt. Mixtures of salts can be used if desired.

GLOSSARY OF TERMS USED HEREIN

In the claims, "salt" means any acceptable water-soluble food grade salt which will not complex with the hop acids, such as those containing sodium, potassium, chloride, sulfate, phosphate, bicarbonate, or carbonate ions.

In this specification, the terms "alpha" and "beta" acids are used. In the literature these terms are used interchangeably with humulones and lupulones.

Likewise, the term "solvent" refers to any acceptable food grade solvent, and solvents other than the preferred solvents enumerated in the examples may be used. Among these are chlorinated solvents, esters, and ketones, and higher boiling hydrocarbons including natural terpenes. Among alcohols other than ethanol which may be used are the lower-alkanols, e.g. methanol and isopropanol.

Purity of the hop acids has conventionally been described in terms of their specific extinction coefficients at a given wave-length in alkaline methanol. This is the technique used to determine the concentrations of the hop acids in the various phases involved in the present invention. It is likewise used to determine the concentration of the starting hop flavors or feed-stocks; e.g., the alpha and isoalpha acid examples utilize materials in excess of 90% purity for the demonstration of the technique of removing trace impurities.

REPRESENTATIVE STARTING MATERIALS (HOP FLAVORS) AND CONDITIONS EMPLOYED

I. Hop Flavors
  A. Total Hop extracts from carbon dioxide or solvent extraction (for preparation of starting hop flavors)
  B. Reduced and unreduced alpha acids
  C. Reduced and unreduced isoalpha acids
II. Solvents
  A. Water for the necessary extraction according to the Invention
  B. Optional food grade water-immiscible solvents such as hexane, and water-miscible solvents such as lower alcohols, e.g., lower-alkanols such as ethanol, residual from preparation of starting hop flavor or otherwise
III. Other
  A. Salts, food grade, including carbonates and bicarbonates, food grade
IV. Conditions
  A. pH at least 4, preferably above 6 or 7
  B. Can be without salt present, but preferably at least ½% salt

DETAILED DESCRIPTION OF THE INVENTION

The following Examples are by way of illustration only and are not to be construed as limiting.

KEY TO EXAMPLES

The key to this invention is the agitation of the unreduced or reduced alpha or isoalpha acid with water at a pH of above about four, separating the water phase, and saving the hop flavor from which the unwanted water-soluble impurities have been removed (pH at least 4 and preferably above 6 and preferably with least ½% w/v and especially more than about 1% w/v salt).

The examples represent the broad range of types of alpha and isoalpha acid starting hop flavors which are available and to which this invention may be applied. The examples also show that different solvents and salts may be present, and illustrate optimum pH ranges for removal of unwanted impurities while minimizing loss of desirable alpha and isoalpha acids.

The examples also show that these undesirable impurities by themselves, or in the starting alpha/isoalpha acid, generate objectionable aromas at a level as low as a ½% w/v level in alcohol (ethanol), and that these same objectionable aromas are also generated when the unpurified isoalpha acids are injected into beer flavored therewith, whereas the novel purified impurity-free isoalpha acids of the invention do not generate such aromas in beer flavored therewith. Example 12 shows how the removed impurities may be fractionated and-/or diluted, so as to convert highly-objectionable materials to more pleasant aromas, which can be used for certain flavoring applications and render the procedure more useful and economic.

TABLE I

The Effect of pH and Salt Concentration Upon the Removal of Odor-Forming Impurities From Tetrahydroisoalpha Acids

| pH | NaCl % w/v | Aroma of ½% w/v Alcoholic Solution of Iso Acid |
|---|---|---|
| 3.0 | 0 | objectionably fruity, nutty, sour |
| 4.0 | 0 | slightly fruity - unobjectionable |
| 5.0 | 0 | very slightly estery - unobjectionable |
| 6.0 | 0 | almost neutral alcoholic |
| 7.0 | 0 | neutral alcoholic |
| 7.0 | ½ | neutral alcoholic |
| 8.0 | 0 | neutral alcoholic |
| 8.0 | ½ | neutral alcoholic |

CONCLUSIONS AND COMMENTS

1. The objectionable odor-forming impurities are substantially removed from the water-insoluble tetrahydroisoalpha acids at a pH of 4 and above.
2. The presence of salt does not affect the removal of these substances.
3. The process is exceptionally simple and efficacious.

Subsequent examples will show that the unpurified isoalpha acid as well as these impurities develop the

TABULATION OF THE EXAMPLES

| Ex. # | Type of Extract | | | | Reduced Isos | | | Range | | Solvents | Bad Aroma |
|---|---|---|---|---|---|---|---|---|---|---|---|
| | whole | alpha | tetraalpha | isoalpha | di | tetra | hexa | pH | % salt w/v | | |
| 1 | | | | | | x | | 3-8 | 0-0.5 | 0 | x |
| 2 | | x | | | | | | 7-9.5 | 2-4 | 0 | x |
| 3 | | x | | | | | | 4-12.3 | 0-3 | 0 | x |
| 4 | | | x | | | | | 7.5 | 0 | hexane | x |
| 5 | | | x | | | | | 8 | 3 | 0 | x |
| 6 | | | | x | | | | 9 | 1-4 | 0 | x |
| 7 | | | | | | x | | 2-9 | 0 | 0 | x |
| 8 | | | x | | | | | 9.3 | 8 | extract | x |
| 9 | | | | | x | | x | 4-7.3 | 0 | hexane | x |
| 10 | | | | | | | | 6-8 | 3 | | x |

EXAMPLE 1

The effect of pH and salt concentration upon the removal of objectionable odor-forming impurities from tetrahydroisoalpha acids.

Tetrahydroisoalpha acids in the form of their potassium salt were made by boiling tetrahydroalpha acid potassium salts, which in turn were made according to the procedure of Worden, and were then converted to their acid form by extraction of the potassium salt solution into hexane, following acidification to a pH of 2, and finally removing the hexane. These tetrahydroisoalpha acids, of greater than 90% purity by uv, were then agitated with water, at 60° C., at ascending pH levels. The water phase was on top, and at each pH a small sample of the isoalpha acid was withdrawn for evaluation.

The same procedure was followed, but with the presence of ½% w/v NaCl, at certain pH values.

The isoalpha acids were made into ½% w/v solutions in alcohol (ethanol), and allowed to stand for five (5) days. The aromas of the solutions were then evaluated olfactorily by a test panel.

Table I portrays the effect of the pH of purification, and effect of salt, upon the removal of the odor-forming impurities.

objectionable aromas when added to beer, and that the purified isoalpha acid does not. They will also show variations which will enable one skilled in the art to practice the invention on various forms of hop flavor products, such as whole hop extracts, all forms of alpha acids (including reduced forms), and all forms of isoalpha acids (including reduced forms).

EXAMPLE 2

Preferred embodiment using alpha acid from carbon dioxide extract and no organic solvent.

A liquid aqueous solution of alpha acid potassium salts is obtained from hops by aqueous alkaline extraction of a carbon dioxide extract of hops by procedure known to the art. Preferably the procedure described in the copending application of Todd, Ser. No. 584,525, now U.S. Pat. No. 4,666,731, previously cited, is employed.

This substantially pure alpha acid solution is agitated with sufficient salt (or concentrated salt solution) to give an overall concentration of salt between 2.0 and 4.0% w/v. The pH is between 7 and 9.5.

The alpha acids form a viscous layer at the bottom of the vessel, and the salt solution floats at the top. The layers are separated by decantation or by use of a separatory funnel or the equivalent.

The procedure is repeated until no further impurities are extracted from the alpha acid into the salt solution.

A specific example is as follows:

Seventy-two grams (72 g) of a 32.7% solution of the potassium salt of alpha acid, at a pH by direct reading of 9.0, was prepared from a carbon dioxide hop extract. To this solution, at a temperature of 30° C. to keep it fluid, sufficient 26% w/v salt solution was added, with agitation, to give an overall concentration of salt of 3% w/v. The pH remained constant. After standing about fifteen minutes, the upper salt solution was decanted from the thick alpha acids. The purification was repeated once more.

The purified alpha acid layer was diluted to a concentration of about 30% w/v, the pH remained at 9, and it was isomerized by heating at 100° C.

The combined salt layers were agitated with one-quarter volume of hexane and acidified to a pH of 2.7. The hexane was separated, removed from the extractables, and 0.37 g of hexane-soluble impurities were recovered (1.6% wt/wt of the starting alpha). The acidified purified isoalpha acids were made into a ½% w/v solution in alcohol (ethanol). The hexane-soluble impurities were made into a ½% w/v solution in alcohol (ethanol).

The original unpurified alpha acid was isomerized in the same manner as the purified alpha acid, and a ½% solution w/v in alcohol (ethanol) of the acidified isoalpha acids was made.

Evaluation of the aroma-forming potential of these materials was as follows:

1. The alcoholic solutions were smelled after standing as noted below.
2. The unpurified and purified isoalpha acids were injected into mild beer to give a concentration of 50 ppm isoalpha acids (an overdose, to accelerate the aroma development). The beers were recapped and aged at room temperature.

The alcoholic solutions were found to develop fruity-estery-fatty aromas as follows: (a,b, and d being decidedly objectionable.)

TABULATION A

| | | Day | | | |
|---|---|---|---|---|---|
| Material | 0 | 3 | 5 | 7 |
| a. unpurified isoalpha acid (made from unpurified alpha) | strong, fatty sour | fatty, sl. fruity | fatty, fruity | fruity sl. fatty |
| b. impurities | strong fatty, cheesy | fatty, cheesy fruity | fatty, fruity | fatty, fruity |
| c. purified isoalpha acid (made from purified alpha) | slight fatty | slight fatty | sl. estery | slight fruity |

The beers were evaluated on the seventh day of storage, with the following results:

d. unpurified isoalpha acid (made from unpurified alpha) - distinct fruity, nutty, sour taste e. purified isoalpha acid (made from purified alpha) - neutral taste without above The foregoing Tabulation demonstrates the following:

1. The impurities generate an objectionable fruity-estery-fatty aroma when standing in alcohol within five (5) days.
2. Isoalpha acid, made from alpha acids from which the impurities have been removed, does not generate these aromas in alcohol.
3. Isoalpha acid, made from the alpha acid from which the impurities have not been removed, generates these objectionable aromas in alcohol.
4. The same results are obtained with the unpurified and purified isoalpha acids in beer.

From a practical standpoint, since the nature of the impurities is not presently known, the rapid development of aromas in alcohol provides a feasible method of evaluating whether or not the undesirable impurities are present in a given alpha acid or isoalpha acid preparation. It would be unacceptable from a control standpoint to have to evaluate every lot of isoalpha acids in a beer to determine if it was unacceptable, because it would take excessively long. The alcohol test is practical for control purposes. As further knowledge is gained as to the nature of the impurities, it is possible that meaningful instrumental methods of control will be established, but none are presently known.

EXAMPLE 3

Interdependence of salt concentration and pH, over the preferred ranges of the invention.

The examples show variations of procedures which allow the removal of undesirable impurities from various types of hop flavor without the loss of significant amounts of desirable alpha acids and their derivatives.

The preferred embodiment of this invention utilizes the presence of salt to decrease the solubility of the alpha acids, and derivatives thereof, in the aqueous phase, relative to the solubility of the impurities. This example portrays the interdependence of salt concentration and pH, thereby enabling one to optimize the two variables for a given processing condition.

In this example, the alpha acid of Example 2, at a concentration of 32.7% in water as its potassium salt, was used.

The pH was adjusted to the indicated levels, and NaCl added to the concentration indicated. The aqueous phase was separated, the percent alpha acids dissolved in the aqueous phase was determined by uv, and the percent of the original alpha acids lost to the water phase noted.

TABLE II

Relation of pH, % Salt, and % Alpha Lost in Purification

| pH. | % NaCl | % Alpha Lost |
|---|---|---|
| 4.0 | 0 | 0.8 |
| 6.4 | 0 | 1.7 |
| 7.2 | 0 | 8.0 |
| 8.0 | 0 | 100.0 |
| 8.0 | 1.0 | 7.9 |
| 8.5 | 1.0 | 25.0 |
| 8.5 | 2.0 | 3.7 |
| 11.3 | 2.0 | 3.9 |
| 12.3 | 2.0 | 10.4 |
| 12.3 | 3.0 | 7.2 |

The above Table II demonstrates the following:

1. There are broad ranges of pH and salt concentration which are acceptable, and in which the loss of alpha is less than 9%. Control parameters are wide enough to permit the invention to be performed under a wide range of conditions.
2. There are ranges of salt concentration (e.g., 2%) which permit wide variations in pH (e.g., 8.5 to 11.3) without significant differences in the amount of alpha lost.

3. A 1% increase in salt concentration will dramatically decrease the amount of alpha lost to the aqueous phase (at pH 8.5, the salt decreases the amount lost from 25% to 3.7%).

This example and subsequent examples also illustrate that, for alpha acid derivatives which are more soluble at a given pH, such as unreduced isoalpha acids, a higher concentration of salt is desirable. These examples enable a practitioner to develop an appropriate table for the specific alpha acid and/or derivative of interest.

For the purposes of commercial operation, the loss of more than 9% alpha acid is considered undesirable for economic reasons. However, it should be understood that the fraction containing the impurities may be added before fermentation, and the undesirable aromas resulting from the impurities will be inhibited by yeast action. The essence of this invention is the teaching that these impurities should not be added post-fermentation, and that they can be removed from hop flavors including hop extracts and derivatives which are normally used post-fermentation.

EXAMPLE 4

Purification of tetrahydroalpha acids.

Tetrahydroalpha acids were prepared according to the method of Worden (U.S. Pat. No. 3,923,897, previously cited). Since the Worden procedure involves the use of hexane as a solvent, in this example it is not removed prior to the purification step. Because of the high viscosity of tetrahydroalpha acids, it may be a preferential procedure to have an inert liquefying solvent present. However, the procedure may also be performed as in Example 2.

Thus, 21.2 g of tetrahydroalpha acids, as a 19.5% solution in hexane, were agitated with 20 ml of water solution and the pH adjusted to 7.5–7.8 with KOH (NaOH or carbonates are equally acceptable).

The lower aqueous phase was separated, and the hexane solution washed twice more with water solution at a pH of 7.5.

The combined water solutions, containing about 2.1% (0.45 g) of the original alpha acids by uv, were extracted with hexane following acidification, the hexane removed, and 0.54 g of impurities recovered, consisting of about 0.09 g (0.4% of the starting tetrahydroalpha acids) non-uv absorbing materials, the impurities which cause the aromas to develop.

A portion of both purified and unpurified tetrahydroalpha acids was converted to tetrahydroisoalpha acids by boiling in alkaline water.

Upon addition to ethanol at a ½% w/v level, and to beer at levels corresponding to 25 ppm of isoalpha acid, as in Example 2, the following results were observed:

|  | Alcohol | Aroma Beer | Type of Aroma |
| --- | --- | --- | --- |
| impurities | strong | objectionably noticeable | fruity, estery |
| orig. alpha | strong | — | fruity, estery |
| orig. isoalpha acid | strong | objectionably noticeable | fruity, estery |
| purif. alpha | absent | — | none |
| purif. isoalpha acid | absent | absent | like control beer |

GENERAL COMMENTS BASED ON EXAMPLES 2, 3, AND 4

These examples show that the odor-forming impurities are present in the original hop extract, carry through into the alpha acids when they are separated, and do not disappear during isomerization.

They establish that a rapid test for the presence of these impurities, which duplicates the behavior in beer upon aging, is the dissolution of the purified extract in ethanol and observation as to whether or not objectionable fatty-fruity-estery aromas develop upon standing over a period of four to six days.

They demonstrate that the easiest and preferred form of the invention is to perform the purification on the alpha acids themselves, since fewer washes are required and less hop flavor is lost to the aqueous phase.

EXAMPLE 5

Purification of tetrahydroalpha acid without the use of solvent.

Tetrahydroalpha acids, made as in the last example, were desolventized. They were then converted into a 20% w/v solution of their potassium salts by agitation with water at a temperature of 60° and sufficient KOH to raise the pH to 8.0. To this solution, comprising 70 ml, was added 8.1 ml of 26% NaCl solution, which resulted in 3% salt in the total mixture. This mixture was agitated for thirty minutes, the aqueous salt solution separated from the lower alpha acids, and the alpha acids reextracted with 38 ml of 5.5% salt solution at a temperature of 60° C. The salt solution was again separated, and the impurities were recovered as in Example 2. They contained 0.6% of the alpha acids by uv. The impurities, soluble in the salt solution, gave a typical objectionable aroma in alcohol, and the purified alpha did not.

If ethanol is used to assist in the solubilization of the tetrahydroalpha acids in water, or for other reasons of convenience, the concentration of the salt is increased to offset the increased solubility of the alpha acid in the ethanolic solution. Alternatively, the pH is reduced.

The tetrahydroalpha acid used in this example was purified without the use of organic solvent. Although it was made with the use of solvent and then desolventized, the purification process works equally well if the tetrahydroalpha acid is made without solvent as in the patent of Cowles (U.S. Pat. No. 4,644,084).

EXAMPLE 6

Purification of isoalpha acids.

A 20% w/v solution of hop extract in hexane was agitated with water and potassium hydroxide added to a pH of 8.7. The aqueous alpha acids layer was separated, reextracted with hexane to remove traces of beta acids if present, and filtered. It was then concentrated to a 30% solution by removing water under vacuum. The alpha acids were isomerized by boiling at atmospheric pressure, with some loss of water, to give unpurified isoalpha acids.

Then 143 g of this isoalpha acids solution in water, at a concentration of 54% isoalpha acid (representing 77.1 g of isoalpha acid), was diluted with water at a temperature of 45° C. to a concentration of 31.5% isoalpha acid, to reduce its viscosity. Thereafter 26% NaCl solution was added in 10 ml increments, to demonstrate the effect of salt concentration and pH on the yield of isoalpha acid according to this procedure. Table III shows the pH and overall salt concentration, and the amount of isoalpha acid lost to the salt solution layer.

TABLE III

| % Salt | pH | % of Original Isoalpha in Upper Water Layer |
|---|---|---|
| 1 | 9 | 11.7 |
| 2 | 9 | 5.5 |
| 3 | 8.9 | 3.8 |
| 4 | 8.9 | 2.3 |

The 4% salt solution was extracted into hexane following acidification, and the hexane removed under vacuum to give 5.7 g, containing 2.7 g isoalpha acid by uv. The 2.7 g isoalpha acid represents 3.5% of the starting 77.1 g, and the 3.0 g of non-isoacid impurities represents 3.9%. (It is possible to decrease the amount of isoalpha acid removed in this fraction by increasing the salt concentration, but this also reduces the efficiency by which the impurities are removed, and a second salt extraction is required. This is feasible if the economics are justified.)

Both the unpurified and purified isoalpha acid, as a ½% w/v solution of its acidic form in ethanol, was evaluated for development of aroma upon standing. A ½% w/v solution of the impurities was likewise evaluated.

The unpurified isoalpha acid and the impurities had a fatty aroma and generated unacceptable estery, fruity aromas in the alcoholic solutions in four days. The purified isoalpha acid did not.

The purified isoalpha acid solution was injected into unhopped beer to give a level of 50 ppm isoalpha acid, and compared to 50 ppm unpurified isoalpha acid in the same beer. The separated impurities were also added to beer to give a level of 1.9 ppm in the beer (the same level at which they would be present in the unpurified isoalpha acids) and compared to the control.

After eight days, a panel of expert beer tasters unanimously identified the beers, containing the unpurified isoalpha acid and containing the impurities, as being more fatty-estery-fruity than the control beer and than the beer flavored with the purified isoalpha acid.

This example demonstrates that it is feasible to perform the purification on isoalpha acids, and also that the impurities are not removed in the isomerization process.

To determine the amount of non-isoalpha acid impurities remaining in the purified isoalpha, 9.0 g were agitated at 40° C. with 4% salt solution at a pH of 8.6. The solution was allowed to cool and the upper layer, containing some flocculent precipitate, probably isoalpha acids, decanted. Upon extraction into hexane following acidification, 0.7 g of material was obtained, which consisted of 0.53 g isoalpha acid by uv, and 0.17 g "impurities". The impurities therefore represent 1.9% of the weight of the previously-purified isoalpha acid.

It should be noted that Humphrey (U.S. Pat. No. 3,875,316), who concentrates the potassium salts of isoalpha acids in methyl iso-butyl ketone as a purification procedure, and then discards the aqueous phase, is not suggestive of this invention. The undesirable odor-forming impurities pass into his ketone with the isoalpha acids, and are not removed therefrom.

EXAMPLE 7

Effect of pH upon the concentration of tetrahydroisoalpha acids in water, in the absence of salt and solvent.

The preferred form of the invention is to use salt, as in Example 5. However, the invention can be performed in the absence of salt, although less efficiently.

The tetrahydroisoalpha acid used in Example 5 was warmed to 60° C. and the pH of the 20% solution adjusted to 9.0 with dilute KOH. The concentration of tetrahydroisoalpha acids was then run on the single aqueous phase. Using concentrated phosphoric acid, so as not to materially change the volume, the pH was dropped to descending levels until a point at which a portion of the tetrahydroisoalpha acids came out of solution. The concentration of the acids remaining in the water was determined by uv assay, and is shown in Table IV.

TABLE IV

| pH | % Concentration Tetrahydroisoalpha Acids in Water | Relative % Isoalpha Lost to Water |
|---|---|---|
| 9.0 | 18.0 | 90 |
| 7.1 | 10.3 | 52 |
| 6.5 | 8.0 | 40 |
| 6.0 | 6.2 | 31 |
| 5.5 | 4.2 | 21 |
| 5.0 | 3.1 | 15.5 |
| 4.5 | 2.5 | 12.5 |
| 4.0 | 0.6 | 4.0 |
| 3.1 | — | 1.5 |
| The 2.0 of Cowles | — | 0.5 |

It is clear that, as expected, the solubility decreases with decreasing pH. It should be noted that in Example 5, at a pH of 8 and a salt concentration of only 0.6% of the tetrahydroalpha acids were lost to the water whereas, at the lower pH 7.1 of this example, and in the absence of salt, more than half the tetrahydroisoalpha acids remained in the water. This clearly demonstrates why at least ½% salt w/v is preferable, since then a higher pH range, above 6.0 (preferable), can be used for purification, and why it is preferable to purify alpha acids rather than reduced alpha acids, since there will then be less loss in the water phase.

The tetrahydroisoalpha acids which had precipitated from the water were removed, and portions of those recovered at a pH of 4.5, 4.0, and at 3.1 and 2.0 were made into ½% w/v solutions in alcohol (ethanol). The pH 4.5 an 4.0 material developed only a very slight aroma due to residual impurities, and the pH 3.1 and 2.0 material was as unsatisfactory as the original material. Therefore, a pH of about 4.0 appears to be a lower limit for the method of this invention.

This example also illustrates another aspect of the invention: the higher the pH, the greater the solubility of the impurities in water. Therefore, the higher the pH at which the purification is effected, the more efficient it will be. Because salt does not materially affect the solubility of the impurities but greatly affects the solubility of the isoalpha acids, the presence of salt enables one to remove a much greater quantity and percentage of the impurities, relative to isoalpha acids lost, than if it is not present.

This example may also explain why the impurities have not been previously discovered in alpha and isoalpha acid preparations, including extracts. They are present in minuscule amounts, are acidic in nature like the alpha and isoalpha acids, and are relatively difficultly separated from the alpha acids in the absence of salt.

EXAMPLE 8

Purification of tetrahydroalpha acids from dilute ethanolic solutions.

At room temperature, the tetrahydroalpha acid of Example 5 was liquified by diluting to a 20% concentration (w/v) in ethanol. To this solution (78 ml) was slowly added 55 ml of 10% $K_2CO_3$ solution, which resulted in a pH of 9.3. To this solution were added incremental amounts of KCl, to give a final concentration of 8% KCl in the total mixture. The temperature remained at ambient. The concentration of alpha acid in the lower aqueous ethanolic phase was determined by uv for these incremental KCl concentrations as follows:

| % KCl | % Tetrahydroalpha in Aqueous Lower Phase |
| --- | --- |
| 2 | no separation visible due to color |
| 4 | no separation visible due to color |
| 6 | 1.8 |
| 8 | 0.94 |

The objectionable materials were recovered from the aqueous phase and, as expected, caused the undesired aromas to develop in ethanol.

It is obvious that the three variables: salt concentration, pH, and ethanol concentrations are mutually interdependent. How to obtain a maximum yield of purified alpha can be determined from this specification, by one skilled in the art, as adapted to available equipment. Likewise, the substitution of KOH for NaOH will affect the relative solubilities, as will the substitution of sulfate, phosphate, citrate, etc., for hydrochloric acid used for pH adjustment, and corresponding but minor compensations for these differences will be necessary.

EXAMPLE 9

Purification of dihydro- and hexahydroisoalpha acids.

As is known to the art, both of these reduced isoalpha acids are made by borohydride reduction of the corresponding alpha acids.

It is preferable to remove the impurities from the alpha acids, prior to isomerization and subsequent reduction to the dihydro- and hexahydroisoalpha acids with alkali and sodium borohydride. However, if that is not feasible, it is still possible to purify these forms of reduced isoalpha acids and to remove the impurities by extraction into the water layer without losing more than a maximum of 9% of the isoalpha acids.

Following reduction of the isoalpha acid with sodium borohydride, it is necessary to add hexane or some other water-immiscible solvent, acidify the mixture to a pH below about 2 and thereby transfer the isoalpha acid to the hexane phase, while decomposing the boron complex and making it water soluble. The water is then discarded, and the hexane phase reextracted with highly-acidic water several times to remove the last traces of boron. Since hexane or the equivalent is present, the purification of this invention may be carried out in its presence; however, it is not required and the purification of the isoalpha acids can be performed in a solvent-free mode.

a. Dihydroisoalpha acids. A 16% aqueous solution of dihydroisoalpha acid, in the form of its potassium salt, is contacted with hexane and the pH dropped to 4.0 with concentrated phosphoric acid, at 50° C. The discarded water layer contains 3.1% of the original isoalpha acid by uv, and develops the unwanted aroma as a ½% w/v solution in ethanol. Similarly, at a pH of 7.3 8.7% of the isoalpha acid is lost to the water layer, and the impurities recovered from this discarded water layer and testes as a ½% w/v solution in ethanol again clearly generate the undesirable aroma.

It should be noted that the aqueous fraction of reduced isohumulone, which still contains the aroma-forming impurities, is claimed as the fraction containing purified reduced isoalpha acids in Westermann (U.S. Pat. No. 3,798,332), so that it could possibly be used as starting material, but only as starting material, for the method of the present invention.

b. Hexahydroisoalpha acids. These are treated in the same manner as in a. above. At a pH of 8 and a salt concentration of 3%, the impurities are removed and only 6% of the isoalpha acids is lost to the water layer. A pH of 6 and 3% salt removes only half as many impurities in a single wash, and a second separation of water is required to purify the hexahydroisoalpha acids to the same degree. Therefore, a pH of about 8 and a salt concentration of about 3% is a preferred range for this form of isoalpha acid.

EXAMPLE 10

Manufacture of useful natural hop aromas from the removed impurities.

Although the precise composition of the objectionable impurities is still unknown, it is reasonable to believe that, at least in part, they contain fatty acids of lower molecular weight present in the hops. This is because they develop fruity-estery aromas, as well as objectionably rancid-nutty-sour aromas upon standing in alcohol (ethanol).

This example demonstrates how these impurities may be aged with ethanol, good aromas separated from bad aromas, and useful aromas used to impart a desired aroma to beer, especially to a nonalcoholic beer.

Impurities as obtained in Example 2 from a carbon dioxide extract of hops are made into ten percent w/v solutions in ethanol, and allowed to stand for at least one month. One percent (1%) by weight of potassium bicarbonate is then added, to form the salts of any acids present, and the aromas-esters removed from the alcohol by careful fractional distillation, preferably under reduced pressure so that the temperature is about 40° C. or below, which makes excess carbonate less reactive with any esters present during the fractional distillation.

Generally, but optionally, the first fraction is discarded, having a sulfidey hay-like aroma, and the latter fractions, which possess sour, rancid-nut like aromas, are also undesirable and are optionally but generally discarded, but in any event these fractions, as well as all fractions, may be diluted. The saved intermediate and/or diluted fractions, which have varying degrees of fruity, citrus, and floral notes, are compounded by the flavorist to achieve an effect considered desirable for a given beer. The pot residue, consisting of alcohol and potassium salts, is discarded.

Nonalcoholic beers are conventionally produced by first fermenting a normal beer, and then fractionating the alcohol from it, leaving behind the malty flavor and hoppy note, but any esters, which contribute a particular light note, have been lost in the alcohol removed and cannot be recovered therefrom due to the minuscule amount present.

When the desirable fruity-estery fractions, as described above, are added to a nonalcoholic beer at the ppb level, a substantial improvement in the nose (aroma) results.

In conclusion, from the foregoing, it is apparent that the present invention provides a novel method for the removal of hitherto-unrecognized undesirable odor-forming impurities from hop flavors, involving extraction of the impurities from such flavors into water at pH above 4, with or without the presence of salt or solvent, but preferably in the presence of salt to "salt out" or "keep out" the flavor from the aqueous phase, as well as the important hop flavor-water two-phase intermediate product at a pH above 4, especially such a product wherein the water contains a food-grade water-soluble salt, the purified hop flavors themselves, which do not contain such impurities in amounts which produce objectionable aromas when allowed to stand with ethanol over a period of days or when added to beer post-fermentation, and beer including ale flavored with such purified isoalpha acid or isohumulone hop flavor, all having the foregoing enumerated characteristics and advantages.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

We claim:

1. A hop flavor composition having an organic phase consisting essentially of a hop flavor selected from unreduced and reduced alpha acids and isoalpha acids and an aqueous phase at a pH of at least 4 and below 8.

2. The product of claim 2, wherein the pH is at least 6.

3. The product of claim 1, wherein the pH is at least 7.

4. The product of any of claims 1-3, wherein the hop flavor is selected from humulone, isohumulone, dihydroisohumulone, tetrahydroisohumulone, and hexahydroisohumulone.

5. The product of any of claims 1 through 3, wherein the organic phase also comprises an organic solvent.

6. The product of any claims 1 through 3, wherein the aqueous phase also comprises ethanol.

7. A beer flavored post-fermentation with an isoalpha acid or isohumulone flavoring agent, selected from unreduced and reduced alpha acids and isoalpha acids, which is essentially odor-causing-impurity free and which therefore has a more reproducible and acceptable flavoring and aroma, said flavoring agent being produced by separation of the flavoring agent as an organic phase from an aqueous solution containing undesirable odor-forming impurities at a pH above 4 in the presence of a food-grade water-soluble salt.

8. A beer flavored post-fermentation with an isoalpha acid or isohumulone flavoring agent of claim 7, wherein the flavoring agent is an isoalpha acid.

9. A beer flavored post-fermentation with an isoalpha acid or isohumulone flavoring agent of claim 8, wherein the isoalpha acid is selected from isohumulone, dihydroisohumulone, tetrahydroisohumulone, and hexahydroisohumulone.

10. A beer flavored post-fermentation with an isoalpha acid or isohumulone flavoring agent of claim 9, wherein the flavoring agent is a tetrahydroisuhumulone.

11. A composition having an organic phase consisting essentially of a flavoring agent selected from unreduced and reduced alpha acids and isoalpha acids and an aqueous phase which contains undesirable odor-forming impurities at a pH of at least 4, wherein the aqueous phase contains a food-grade water-soluble salt.

12. The product of claim 11, wherein the pH is at least 6.

13. The product of claim 12, wherein the pH is at least 7.

14. The composition of any claims 11, 12 or 13, wherein the flavoring agent is selected from humulone, isohumulone, dihydroisohumulone, tetrahydroisohumulone, and hexahydroisohumulone.

15. The product of any of claims 11-13, wherein the food-grade water-soluble salt is present at a concentration of at least one-half percent weight/volume.

16. The product of claim 15, wherein the food-grade water-soluble salt is present at a concentration sufficient to maintain no more than about nine percent of the flavoring agent in the aqueous phase.

17. The product of claim 15, wherein the food-grade water-soluble salt is present at a concentration of at least two percent weight/volume.

18. The product of any of claims 11-13 and 16-17, wherein the salt is sodium chloride.

19. The product of any of claims 11-13, 16 and 17, wherein the organic phase also comprises a food-grade organic solvent.

20. A hop flavor composition of claim 11, wherein the organic phase consists essentially of tetrahydroisohumulone and wherein the aqueous phase contains at least about one-half percent weight per volume of salt and wherein the pH is at least about 6.

21. The product of claim 20, wherein the aqueous phase also comprises ethanol.

22. A beer flavored post-fermentation with an isoalpha acid or isohumulone flavoring agent, selected from unreduced and reduced alpha acids and isoalpha acids, which is essentially odor-causing-impurity free and which therefore has a more reproducible and acceptable flavoring and aroma, said flavoring agent being produced by separation of the flavoring agent as an organic phase from an aqueous solution containing undesirable odor-forming impurities at a pH above 4 and below 8.

23. A beer flavored post-fermentation with an isoalpha acid or isohumulone flavoring agent of claim 22, wherein the flavoring agent is an isoalpha acid.

24. A beer flavored post-fermentation with an isoalpha acid or isohumulone flavoring agent of claim 23, wherein the isoalpha acid is selected from isohumulone, dihydroisohumulone, tetrahydroisohumulone, and hexahydroisohumulone.

25. A beer flavored post-fermentation with an isoalpha acid or isohumulone flavoring agent of claim 24, wherein the flavoring agent is a tetrahydroisohumulone.

* * * * *

UNITED STATES PATENT AND TRADEMARK OFFICE
CERTIFICATE OF CORRECTION

PATENT NO. : 5,041,300

DATED : Aug. 20, 1991

INVENTOR(S) : Paul H. Todd, Jr., James A. Guzinski

It is certified that error appears in the above-identified patent and that said Letters Patent is hereby corrected as shown below:

```
Title Page, after [73] and before [21], insert -- [*]  The portion
   of the term of this patent subsequent to September 11, 2007
   has been disclaimed. --.

Column 2, line 36; "a essentially" should read
   -- an essentially --.
Column 14, approximately line 33; "of only 0.6%" should read
   -- of 3%, only 0.6% --.
Column 16, lines 4/5; "testes" should read -- tested --.
Column 17, line 38; "claim 2" should read -- claim 1 --.(old Cl.35)
```

Signed and Sealed this

Ninth Day of February, 1993

*Attest:*

STEPHEN G. KUNIN

*Attesting Officer*     *Acting Commissioner of Patents and Trademarks*